Jan. 12, 1943. G. G. BUDWIG 2,308,045
GARDEN CART
Filed Aug. 31, 1939

INVENTOR.
GILBERT G. BUDWIG
BY
ATTORNEY.

Patented Jan. 12, 1943

2,308,045

UNITED STATES PATENT OFFICE 2,308,045

GARDEN CART

Gilbert G. Budwig, Burbank, Calif., assignor to Budwig Manufacturing Company, Inc., Burbank, Calif., a corporation of California Application August 31, 1939, Serial No. 292,816

1 Claim. (Cl. 280—51)

This invention relates to wheeled land vehicles, and has for an object the provision of a wheeled cart adapted for hand operation and possessed of details of construction which make it particularly adapted for use as a garden cart capable of offering much convenience in transporting such loads as a garden wheelbarrow is intended to handle, but with considerably greater convenience and without requiring as much muscular effort as required by a wheelbarrow of comparable capacity.

Another object of my invention is the provision of a garden cart of the general character indicated, in which especial provision is made for facile and expeditious loading and unloading, no lifting of the material being loaded or unloaded being required inasmuch as the cart is arranged to be tipped into a position substantially corresponding to that of a dust pan in use, thus facilitating placing material within, and removal therefrom, by a simple pushing or pulling movement, as by means of an ordinary garden rake.

A further object of my invention is the provision of a garden cart as described, which is provided with a leg normally extended to that position in which it supports the cart in its operating, or transporting position, but which is so arranged that it can be folded back to that position in which the cart is permitted to tip to loading and unloading position, with a minimum of effort on the part of the operator.

A still further object is to provide a garden cart of the general character described, of extremely simple and inexpensive construction, and yet sufficiently rugged and durable to adapt it for the performance of serious work in such a manner as to offer much convenience as a garden accessory.

The invention possesses other objects and features of advantage, some of which, with the foregoing, will be set forth in the following description of the preferred form of my invention which is illustrated in the drawing accompanying and forming a part of the specification. It is to be understood that I do not limit myself to the showing made by the said drawing and description, as I may adopt variations of the preferred form within the scope of my invention as set forth in the claim.

Referring to the drawing:

Figure 1 is a view in side elevation of a garden cart embodying the principles of the present invention. The cart is shown in its operating, or transporting position. Portions of the figure are broken away to reduce its size.

Figure 1:
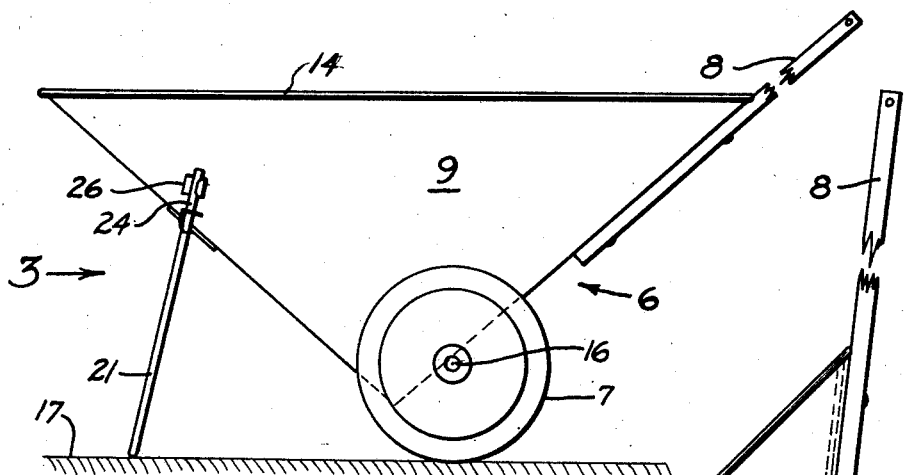

Specifically describing that embodiment of my invention which has been chosen for illustration, my improved garden cart comprises a body 6 supported on wheels 7 and provided with a handle 8 sloping upwards and aft to position its upper end at convenient elevation to permit its being grasped by the hand of an operator, inasmuch as the cart is intended for hand operation. The body 6 is of substantially triangular configuration in longitudinal section. It comprises two opposed side walls 9, preferably of identical configuration, as this facilitates the process of manufacture, and front and back end walls 11 and 12, respectively.

The side walls are each of triangular form, and they are disposed with their apices downward. An inturned flange 13 is provided along each front and rear edge of each of the side walls, thus providing support for the front and rear end walls 11 and 12, which are thus disposed in sloping relation to the horizontal when the cart is in upright position. These two end walls are also preferably of identical construction, and they may be continuous with each other, if production would be facilitated by such an arrangement. At any rate, they engage each other in a line which joins the apices of the two opposed side walls, thus providing an effective closure for the bottom of the cart's body 6.

Any suitable fastening means may be resorted to to fasten the walls of the body 6 together, such as spot welding. All of the walls are preferably formed of sheet metal; and their formation in the configuration illustrated and described is of commercial importance, inasmuch as it has been found that these shapes lend themselves to production from sheet material with a minimum of wastage of that material.

Beading 14 may be provided at the upper edges of all of the walls 9, 11, and 12, in order to strengthen the body and impart rigidity thereto.

Figure 2:
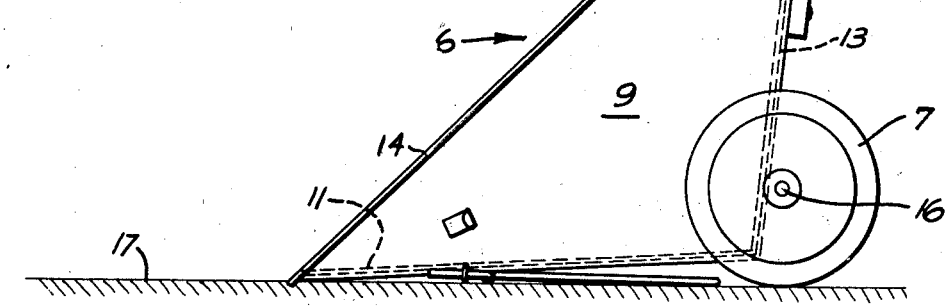
Figure 2 is a view similar to Fig. 1, but showing the cart tipped to its loading or unloading position. Portions of this figure, also, are broken away to reduce its size.

The wheels 7 are journaled upon axially aligned axle shafts 16 extending laterally beyond the side walls 9. These shafts 16 are mounted in any suitable manner, as by means of suitable brackets (not shown) and they may conveniently be formed upon opposite ends of a rod common to both and extending across the body 6, preferably being affixed to the under side of the after end wall 12. The parts are so proportioned and arranged that the center of gravity of the cart is materially forward of the vertical plane which includes the axis of the axle shafts 16, with the result that the cart is always under the influence of gravity, urging it to tip forward to the position illustrated in Fig. 2. This is a convenient position for the cart while being loaded or unloaded, for the reason that the forward, upper edge of the front end wall 11 rests upon the ground or whatever other supporting surface 17 the cart rests upon, with the result that material can conveniently be swept or raked into or out of the cart in much the same manner as a common dust pan is used. Toward this same end, it should be observed that the distance from the axis of the axle shafts 16 to the line of juncture of the front and rear walls 11 and 12, respectively, is only slightly less than the radius of the wheels 7. This permits the front wall 11 to assume a position only slightly out of parallel with the supporting surface 17, as shown in Fig. 2. This feature, coupled with the fact that the forward, upper edge of the front wall 11 which rests upon the supporting surface 17, corresponds to the full width of the body 6, thus presenting a mount or lip of maximum width, makes for the utmost convenience in loading and unloading the cart.

Due to the inverted triangular cross sectional configuration of the cart, any material placed therein slides to the bottom of the body after the cart has been returned to upright position, with the result that it automatically is caused to assume a position wherein its center of gravity will be not far displaced from the vertical plane which includes the center of gravity of the cart itself. Hence, whether it be empty, partly loaded, or full, the natural tendency of the cart is to tip forward to the Fig. 2 position, but not to such extent that the operator will experience any difficulty or inconvenience in maintaining the cart upright while wheeling it from place to place, a slight downward pressure on the handle 8 being sufficient for this purpose.

However, means are provided for supporting the cart in its upright position whenever desired, so that it can be left standing without danger of displacement of its contents. A supporting leg 21 is pivotally mounted upon the front end wall 11, this leg preferably being formed of a suitable rod bent to substantially U-shaped configuration with axially aligned lateral extensions 22 at its two ends. These extensions 22 are journaled in brackets 23 affixed to the front wall 11, with the result that the leg 21 is mounted for swinging movement to and from its operating position. One of the extensions 22 is sufficiently longer than the other to permit its end 24 to be so bent that it extends around the proximal corner of the body 6 to engage a stop bracket 26 affixed to the associated side wall 9. The leg 21 and its stop bracket 26 are so arranged that when they are in engagement, the lower end of the leg 21 is disposed at a greater distance from the axis of the axle shafts 16 than the axis of the leg's pivotal connection to the body. Hence, the downward pressure exerted by the body against the leg 21 only serves to press the leg the more firmly into engagement with its stop bracket, with the result that the leg cannot inadvertently become displaced and permit the cart to tip. However, when the operator desires to tip the cart, it is necessary only to push the cart forward slightly without raising the leg from the ground, whereupon the lower end of the leg will be carried back toward the rear of the cart, and by continuing this movement of the cart until its forward edge contacts the ground, the leg 21 can be folded back to the position illustrated in Fig. 2 without the necessity of any manipulation by the operator other than pushing against the handle 8.

Figure 3:
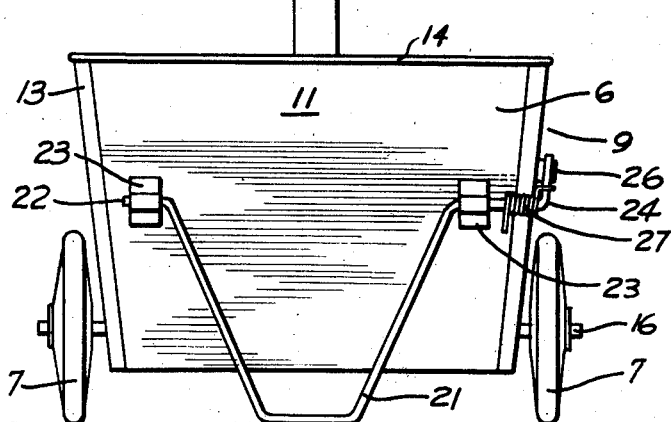
Figure 3 is a front elevation, the direction of view being indicated by the arrow 3 of Fig. 1.

A spring 27 is provided upon the leg 21, and is so arranged that it continuously urges the leg toward its operating, or supporting position. Accordingly, when the operator wishes that the cart again be supported in its upright position, it is necessary only for him to lower the handle 8, thus raising the front end of the cart, far enough to permit the leg 21 to clear the ground. The spring 27 will then swing the leg 21 forward until it attains the position in which it is shown in Figures 1 and 3; and when the operator subsequently lowers the front end of the cart, it will come to rest thereupon, and be supported in upright position. The cart is thus retained in upright position with ample stability, for the reason that the vertical plane which includes the axis of the pivotal mounting of the leg 21 is on the opposite side of the center of gravity of the cart, whether it be empty or loaded, from the vertical plane which includes the axis of the axle shafts 16.

I claim:

A garden cart of the character described, comprising a body, supporting wheels therefor, means mounting said wheels on said body for rotation about an axis aft of the center of gravity of said body whereby said body is continuously urged by gravity to tip to unloading position by swinging forward and down about said axis, and means for releasably retaining said body erect comprising a leg pivoted to the forward part of said body, means limiting forward movement of said leg to retain it in position to support the forward end of said body when said body is erect, said leg being movable from said supporting position by being swung aft by contact of its lower end with the surface upon which it is supported when said cart is moved forward, and a spring interposed between said leg and said body and urging said leg to its supporting position whereby said leg is automatically returned to supporting position when said forward part of said body is elevated sufficiently for the lower end of said leg to clear said supporting surface.

GILBERT G. BUDWIG.